US005420738A

United States Patent [19]
Katsuta

[11] Patent Number: 5,420,738
[45] Date of Patent: May 30, 1995

[54] AUDIO TAPE CASSETTE COMPRISING A FELT PAD AND A MAGNETIC TAPE HAVING A SPECIFIED BACK COAT LAYER

[75] Inventor: Yoshiharu Katsuta, Takatsuki, Japan

[73] Assignee: Hitachi Maxell, Ltd., Osaka, Japan

[21] Appl. No.: 8,847

[22] Filed: Jan. 25, 1993

Related U.S. Application Data

[63] Continuation of Ser. No. 569,973, Aug. 20, 1990, abandoned.

[30] Foreign Application Priority Data

Aug. 22, 1989 [JP] Japan .................................. 1-216688

[51] Int. Cl.⁶ .................................................. G11B 5/00
[52] U.S. Cl. ........................... 360/130.33; 360/130.31;
428/409; 428/425.9; 428/424.6; 428/436;
428/523; 428/694 TB; 428/694 BB; 428/900
[58] Field of Search ............. 428/694, 695, 900, 424.6,
428/409, 425.9, 694 TB, 694 BB, 523, 436;
360/130.31, 130.33; 206/387

[56] References Cited

U.S. PATENT DOCUMENTS

| | | | |
|---|---|---|---|
| 3,682,486 | 8/1972 | Zwetzig et al. | 274/4 B |
| 4,532,178 | 7/1985 | Matsumoto | 428/328 |
| 4,555,443 | 11/1985 | Kikugawa et al. | 428/336 |
| 4,573,095 | 2/1986 | Bordignon | 360/130.31 |
| 4,612,593 | 9/1986 | Oishi | 360/130.31 |
| 4,720,413 | 1/1988 | Horiguchi et al. | 428/141 |
| 4,780,782 | 10/1988 | Bordignon | 360/130.31 |
| 4,789,583 | 12/1988 | Akutsu | 428/143 |
| 4,871,606 | 10/1989 | Matsuura et al. | 428/147 |
| 4,922,361 | 5/1990 | Bordignon | 360/130.31 |

*Primary Examiner*—Stevan A. Resan
*Attorney, Agent, or Firm*—Birch, Stewart, Kolasch & Birch

[57] ABSTRACT

An audio tape cassette comprising a cassette shell, a pair of hubs which is rotatably positioned in the cassette shell, a magnetic tape which is wound around the hubs with its magnetic layer facing outward, guiding parts which are positioned in the cassette shell and guide the running direction of the magnetic tape, and a felt pad which is positioned between the hubs at the front of the shell, which contacts a back of the magnetic tape to press the magnetic tape to a magnetic head, wherein the magnetic tape has a back coating layer which comprises a pigment and a binder having a coefficient of friction not larger than 0.4 against the felt pad which has good runnability, and wherein generation of wow, flutter and modulation noise is apparent and edge damage of the magnetic tape is prevented.

9 Claims, 1 Drawing Sheet

AUDIO TAPE CASSETTE COMPRISING A FELT PAD AND A MAGNETIC TAPE HAVING A SPECIFIED BACK COAT LAYER

This application is a continuation of application Ser. No. 07/569,973, filed on Aug. 20, 1990, now abandoned.

BACKGROUND OF THE INVENTION

1. Field of the Invention

The present invention relates-to an audio tape cassette. More particularly, the present invention relates to an audio tape cassette in which a magnetic tape has good runnability and does not suffer from edge damage, and which can reduce wow, flutter and modulation noise.

2. Description of the Related Art

An audio tape cassette generally comprises a cassette shell, a pair of hubs which is rotatively positioned in the cassette shell, a magnetic tape which is wound around the hubs, guiding parts which are positioned at suitable positions in the cassette shell and guide the magnetic tape in a running direction, and a felt pad which is positioned between the hubs and contacts a back of the magnetic tape and presses the magnetic tape to a magnetic head.

To improve runnability of the magnetic tape in the cassette shell, various measures which improve the of friction between a magnetic layer of the magnetic tape and the magnetic head, the surface properties of the magnetic layer and/or hardness of the magnetic tape, or the accuracy and/or the material of the cassette shell and the guiding parts have been proposed.

However, since these measures for improving the runnability of the magnetic tape take only a part of the tape transportation into consideration, none of them has satisfactorily improved the runnability of the magnetic tape while reducing the wow, flutter and modulation noise effectively. In addition, an edge of the magnetic tape is broken or elongated to cause edge damage.

SUMMARY OF THE INVENTION

One object of the present invention is to provide an audio tape cassette which does not cause edge damage to a magnetic tape.

Another object of the present invention is to provide an audio-tape cassette which can reduce the wow, flutter and modulation noise.

These and other object of the present invention can be achieved by an audio tape cassette comprising a cassette shell, a pair of hubs which is rotatably positioned in the cassette shell, a magnetic tape which is wound around the hubs with its magnetic layer facing outward, guiding parts which are positioned in the cassette shell and which guide the magnetic tape in a running direction, and a felt pad which is positioned between the hubs and contacts a back of the magnetic tape to press the magnetic tape to a magnetic head, wherein the magnetic tape has a back coating layer which comprises a pigment and a binder and has a coefficient of friction of not larger than 0.4 against the felt pad.

Preferably, the back coating layer has a center line average height of not larger than 0.03 μm and a pencil hardness of not higher than "5H".

To complete the present invention, investigations have been made on conditions which effect all the parts of tape transportation which contact the magnetic tape. As a result, it has been found that, since many parts contact the back of the magnetic tape in the audio tape cassette, it is preferable to provide a back coating layer on the back of the magnetic tape which will improve the runnability of the magnetic tape. However, when a conventional back coating layer, which is used mainly in a video tape, is used in an audio tape cassette, since the back coating layer for the video tape, which suitably contacts hard materials such as metals or engineering plastics, should contact the felt pad and comparatively soft resins of the audio tape cassette, the friction between the back coating layer and the felt pad increases so that the pad is contaminated in black and the guiding system is damaged.

DETAILED DESCRIPTION OF THE INVENTION

The present invention will be explained in detail by making reference to the accompanying drawings.

Figure 1:
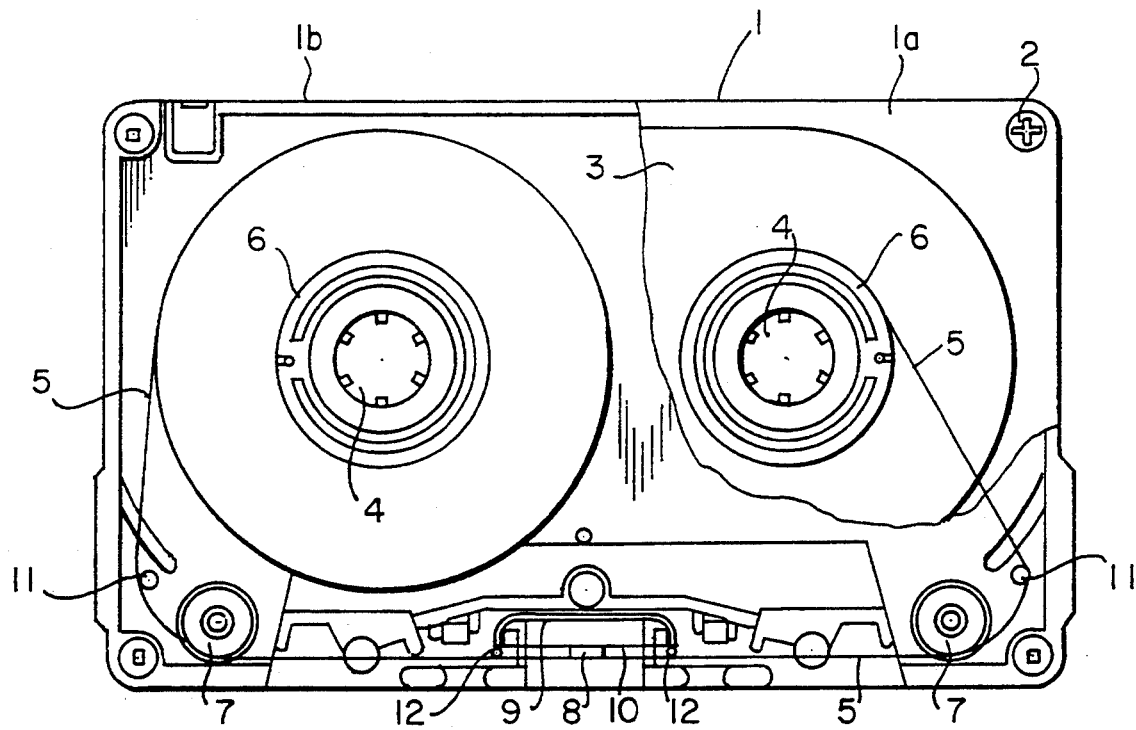
FIG. 1 is a partly cut-away plan view of an embodiment of the audio tape cassette of the present invention.

FIG. 1 is a partly cut-away plan view of an embodiment of the audio tape cassette of the present invention. In this cassette, a cassette shell 1 comprises upper and lower halves 1a and 1b which are bonded together with screws 2, and has a transparent window 3 and a pair of holes 4, 4 through which capstans are inserted. In the cassette shell 1, a pair of hubs 6, 6 are mounted on the insertion holes 4, 4, respectively, and a magnetic tape 5 is wound around the hubs 6, 6. As a guiding system for the running magnetic tape 5, guide pins 11, 11, guide rolls 7, 7 and guide pins 12, 12 are provided in a front area of the cassette shell 1. Between the hubs 6, 6, at the front of the cassette shell, there is provided a felt pad 8 which is fixed on a spring plate 10, which contacts the back of the magnetic tape and presses the magnetic tape to a magnetic head (not shown). Also, a magnetic screening shield 9 is provided.

Figure 2:
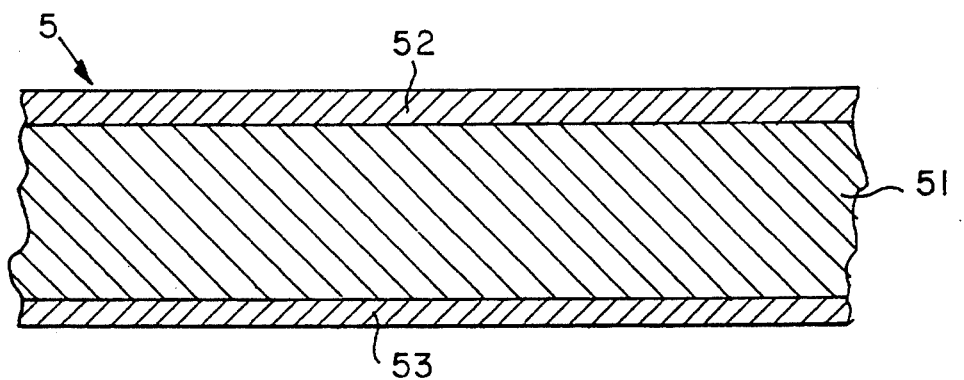
FIG. 2 is a cross-sectional view of a magnetic tape to be assembled in the audio tape cassette of the present invention.

As seen in FIG. 2, the magnetic tape 5, which is wound around the hubs 6, 6, comprises a substrate 51 made of, for example, a polyester film, one magnetic layer 52 formed on a surface of the substrate 51 and a back coating layer 53 comprising a pigment and a binder formed on a back of the substrate 51. Through proper selection of kinds of pigment and binder, a coefficient of friction of the back coating layer against the felt pad is adjusted to 0.4 or less, while maintaining a center line average height to 0.03 μm or less, and a pencil hardness to "5H" or softer, preserving adequate flexibility.

Since, in the audio tape cassette implementing the magnetic tape 5, the coefficient of friction of the back coating layer 53 against the felt pad is not larger than 0.4, the center line average height is not larger than 0.03 μm and the back coating layer 53 has adequate flexibility, the runnability of the magnetic tape 5 is satisfactorily improved, whereby generation of wow, flutter and modulation noise is effectively suppressed, and the edge damage of the magnetic tape prevented.

The back coating layer having the small coefficient of friction against the felt pad and small center line average height may be produced by selecting, as the binder, a resin having a coefficient of friction against the felt pad of not larger than 0.4 and, as the pigment, a material having an average particle size of from 0.005 to 2 μm and Moh's hardness of not larger than 4, mixing the binder resin and the pigment with an organic solvent and other optional components to prepare a back coating paint, coating the back coating paint on the back of the substrate 51, on the surface of which the magnetic layer 52 has been formed, and drying the paint to form the back coating layer.

As the binder resin to be contained in the back coating layer, a resin having a coefficient of friction against the felt pad of not larger than 0.4 when the back coating layer is formed from the resin alone is preferably used. Examples of such a binder resin are a vinyl chloride-vinyl acetate copolymer having a coefficient of friction against the felt pad of 0.36, a saturated polyester resin having a coefficient of friction against the felt pad of 0.38 and a polyurethane resin having a coefficient of friction against the felt pad of 0.39. Since nitrocellulose or unsaturated polyesters have a coefficient of friction against the felt pad of 0.54 or 0.55, respectively, it cannot sufficiently reduce the coefficient of friction of the back coating layer and is not preferably used as the binder resin in the present invention.

As the pigment, one having an average particle size of 0.005 to 2 μm and a Moh's hardness of not larger than 4 is preferably used. Examples of such pigment are $CaCO_3$ having a Moh's hardness of 3.0 and an average particle size of 0.01 to 2 μm and carbon black having a Moh's hardness of 1.0 and an average particle size of 0.005 to 0.2 μm. When such a pigment is incorporated in the back coating layer, the back coating layer has a center line average height of not larger than 0.03 μm and adequate flexibility, whereby the guiding system, such as the guide pin, is less damaged. If a pigment having a Moh's hardness of larger than 4 is used, the back coating layer does not have adequate flexibility which damages the guide pin and the like.

The thickness of the back coating layer depends on the surface roughness of the substrate and the particle size of the pigment. It is preferred that the thickness range from 0.3 to 2 μm to achieve suitable surface roughness of the back coating layer.

The magnetic layer 52 of the magnetic tape 5 is formed by a per se conventional method, for example, by mixing and dispersing conventionally used magnetic powder (e.g. cobalt-containing $\gamma$-$Fe_2O_3$ powder, barium ferrite powder, iron powder, cobalt powder, etc.) with a binder resin, an organic solvent and optional components to prepare a magnetic paint, coating the magnetic paint on the surface of the substrate 51 made of, for example, a polyester film and drying the coated magnetic paint.

As the felt pad 8 of the audio tape cassette, preferably a felt pad made of angora rabbit hair is used, since its coefficient of friction is stable under various conditions.

The guiding parts, such as guide pins 11, 11, are preferably made of a resin having good abrasion resistance. For example, an ethylene-propylene copolymer and a phenol resin are preferably used. When the guiding parts are produced from such a resin, the ethylene-propylene copolymer may contain calcium carbonate and further ZnO, and the phenol resin may contain glass fibers. When such a resin or resin composite is used, the abrasion resistance of the guiding parts is increased, so that the runnability of the magnetic tape 5 is improved and damage of the magnetic tape is prevented.

PREFERRED EMBODIMENTS OF THE INVENTION

The present invention will be illustrated by the following Examples, in which parts and percentages are by weight unless otherwise indicated.

EXAMPLE 1

Following components were mixed and dispersed in a ball mill for 62 hours to prepare a magnetic paint:

| Component | Parts |
| --- | --- |
| α-Fe magnetic powder | 100 |
| Vinyl chloride-vinyl acetate-vinyl alcohol copolymer (VAGH manufactured by UCC, USA) | 10 |
| Polyurethane (Polyurethane N 2304 manufactured by Nippon Polyurethane Industries) | 7 |
| Fatty acid ester | 4 |
| Trifunctional low molecular weight isocyanate compound (Colonate L manufactured by Nippon Polyurethane Industries) | 2 |
| Toluene | 130 |
| Cyclohexanone | 130 |

The magnetic paint was coated on a surface of a polyester base film having a thickness of 10 μm to a dry thickness of 5 μm and dried to form a magnetic layer followed by planishing.

On a back of the substrate carrying the formed magnetic layer on its surface, a back coating paint having the following composition was coated to a dry thickness of 0.6 μm and dried to form a back coating layer.

| Component | Parts |
| --- | --- |
| Vinyl chloride-vinyl acetate-vinyl alcohol copolymer (VAGH manufactured by UCC, USA) | 20 |
| Polyurethane (Polyurethane N 2304 manufactured by Nippon Polyurethane Industries) | 20 |
| Trifunctional low molecular weight isocyanate compound (Colonate L manufactured by Nippon Polyurethane Industries) | 10 |
| Carbon black (av. particle size of 0.01 μm) | 5 |
| $CACO_3$ (av. particle size of 0.04 μm) | 45 |
| Toluene | 280 |
| Cyclohexanone | 280 |

Then the substrate film carrying the magnetic layer and the back coating layer was cut to a predetermined width to fabricate the magnetic tape of FIG. 2.

Separately, an ethylene-propylene copolymer (100 parts), $CaCO_3$ having an average particle size of 3 to 5 μm (20 parts) and ZnO having an average particle size of 3 to 5 μm were mixed and made molten. Then, the molten mixture was injection molded to produce halves 1a and 1b of a cassette shell of an audio tape cassette.

Before the halves of the cassette shell were engaged and bonded, the above produced magnetic tape was wound around a hub and installed in the cassette shell to assemble an audio tape cassette as shown in FIG. 1.

EXAMPLE 2

In the same manner as in Example 1 but changing the amount of VAGH in the back coating paint from 20 parts to 25 parts and the amount of Polyurethane N 2304 in the back coating paint from 20 parts to 15 parts, using no carbon black and changing the amount of $CaCO_3$ from 45 parts to 50 parts, a magnetic tape was produced and an audio tape cassette was assembled.

EXAMPLE 3

In the same manner as in Example 1 but changing the amount of VAGH in the back coating paint from 20 parts to 10 parts and the amount of Polyurethane N 2304 in the back coating paint from 20 parts to 30 parts, using no carbon black and changing the amount of CaCO$_3$ from 45 parts to 50 parts, a magnetic tape was produced and an audio tape cassette was assembled.

EXAMPLE 4

In the same manner as in Example 1 but using neither VAGH nor carbon black in the back coating paint, changing the amount of Polyurethane N 2304 in the back coating paint from 20 parts to 40 parts and changing the amount of CaCO$_3$ from 45 parts to 50 parts, a magnetic tape was produced and an audio tape cassette was assembled.

Comparative Example 1

In the same manner as in Example 1 but using no VAGH in the back coating paint, changing the amount of Polyurethane N 2304 in the back coating paint from 20 parts to 40 parts and using 45 parts of ZnO in place of CaCO$_3$, a magnetic tape was produced and an audio tape cassette was assembled.

Comparative Example 2

In the same manner as in Example 1 but using the same amount of nitrocellulose in place of VAGH in the back coating paint, changing the amount of carbon black from 5 parts to 40 parts and using 10 parts of red iron oxide in place of CaCO$_3$, a magnetic tape was produced and an audio tape cassette was assembled.

Comparative Example 3

In the-same manner as in Comparative Example 2 but changing the amount of carbon black in the back coating paint from 40 parts to 50 parts and using no red iron oxide, a magnetic tape was produced and an audio tape cassette was assembled.

Comparative Example 4

In the same manner as in Comparative Example 2 but changing the amount of carbon black in the back coating paint from 40 parts to 15 parts and using 45 parts of CaCO$_3$ in place of red iron oxide, a magnetic tape was produced and an audio tape cassette was assembled.

Comparative Example 5

In the same manner as in Comparative Example 2 but using 45 parts of an unsaturated polyester resin in place of nitrocellulose and polyurethane in the back coating paint, changing the amount of trifunctional isocyanate compound from from 10 parts to 5 parts and the amount of carbon black from 40 parts to 5 parts and using no red iron oxide, a magnetic tape was produced and an audio tape cassette was assembled.

Comparative Example 6

In the same manner as in Example 1 but forming no back coating layer, a magnetic tape was produced and an audio tape cassette was assembled.

With each of the audio tape cassettes produced in Examples and Comparative Examples, a coefficient of friction of the back coating layer against the felt pad was measured, and after a 10 hour running of the magnetic tape, contamination of the felt pad, abrasion of the guide pins and edge damage of the magnetic tape were observed and the wow and flutter were measured.

The contamination of the felt pad was evaluated according to the following criteria:
A: No contamination
B: Slight contamination
C: Much contamination The abrasion of the guiding pins was evaluated according to the following criteria:
A: No abrasion
B: Slight abrasion
C: Heavy abrasion The edge damage of the magnetic tape was evaluated according to the following criteria:
A: No damage
B: Slight damage
C: Heavy damage The wow and flutter were measured by using a head phone type cassette deck and a wow and flutter meter at a measuring frequency of 3 KHz along all the length of the magnetic tape. Then, the magnetic tape having the maximum value of less than 0.1 (% W. RMS) was ranked "A" and that having the maximum value of 0.1 or larger was ranked "C".

Further, the pencil hardness of the back coating layer was measured according to JIS K 5400, Item 6.14.

The results are summarized in the following Table.

TABLE

| Example No. | Coefficient of friction | Contamination of felt pad | Abrasion of guide pins | Edge damage | Wow and flatter | Pencil hardness |
| --- | --- | --- | --- | --- | --- | --- |
| 1 | 0.38 | B | A | B | A | 4H |
| 2 | 0.32 | A | A | A | A | 5H |
| 3 | 0.34 | A | A | A | A | 4H |
| 4 | 0.38 | A | B | B | A | 4H |
| Comp. 1 | 0.42 | C | C | B | C | 8H |
| Comp. 2 | 0.55 | C | C | C | C | 9H |
| Comp. 3 | 0.52 | C | A | C | C | 6H |
| Comp. 4 | 0.51 | C | B | C | C | 7H |
| Comp. 5 | 0.55 | C | A | C | C | 6H |
| Comp. 6 | 0.40 | B | B | C | C | *1) |

In the audio tape cassettes of the present invention produced in Examples 1-4, the coefficient of friction of the back coating layer against the felt pad is smaller than that in the audio cassettes produced in Comparative Examples 1-6. In addition, the audio tape cassettes less suffer from the contamination of the felt pad, abrasion of the guide pins or edge damage of the magnetic tape and have extremely low wow and flutter. As the pencil hardness becomes harder (higher), the coefficient of friction of the back coating layer against the felt pad increases.

The above results indicate that the audio tape cassettes of the present invention had good runnability of the magnetic tape, suppressed the wow, the flutter and the modulation noise and prevented edge damage to the magnetic tape.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An audio tape cassette comprising a cassette shell, a pair of hubs positioned to rotate in said cassette shell, a magnetic tape having a back coating layer wound around said hubs and having a magnetic layer facing outward, said back coating layer having a pencil hardness of not harder than "5H" and a center line average height of not larger than 0.03 μm, guiding parts positioned in said cassette shell to guide said magnetic tape in a running condition, and a felt pad of angora rabbit fur positioned between said pair of hubs at a front of said cassette shell which contacts said back coating layer of said magnetic tape to press said magnetic tape to a magnetic head, wherein said back coating layer comprises a pigment having a Moh's hardness not larger than 4 dispersed in a binder resin such that said back coating layer has a coefficient of friction against said felt pad of not larger than 0.4.

2. The audio tape cassette according to claim 1, wherein said pigment is $CaCO_3$.

3. The audio tape cassette of claim 1, wherein said binder resin is selected from at least one member of the group consisting of a vinyl chloride-vinyl acetate copolymer and a polyurethane resin.

4. The audio tape cassette according to claim 1, wherein said cassette shell is made of a synthetic resin.

5. The audio tape cassette according to claim 4, wherein said synthetic resin is an ethylene-propylene copolymer.

6. The audio tape cassette according to claim 4, wherein said synthetic resin is a phenol resin.

7. The audio tape cassette according to claim 1, wherein said cassette shell is made of a composite of an ethylene-propylene copolymer and calcium carbonate.

8. The audio tape cassette according to claim 7, wherein said composite of the ethylene-propylene copolymer and calcium carbonate further includes ZnO.

9. The audio tape cassette according to claim 1, wherein said cassette shell is made of a composite of a phenol resin and glass fibers.

* * * * *